(12) United States Patent
Spackman (10) Patent No.: US 8,928,607 B1
(45) Date of Patent: Jan. 6, 2015

(54) HANDHELD INPUT DEVICE FOR A COMPUTER

(75) Inventor: Stephen Philip Spackman, San Jose, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 13/482,967

(22) Filed: May 29, 2012

(51) Int. Cl.
*G06F 3/041* (2006.01)

(52) U.S. Cl.
USPC .............................. 345/173; 345/156; 345/158

(58) Field of Classification Search
CPC ......... G06F 3/038; G06F 3/041; G06F 3/033; G06F 3/01; G09G 5/00; G09G 5/373
USPC ....................................................... 725/1–22
See application file for complete search history.

(56) References Cited

U.S. PATENT DOCUMENTS

| 7,937,723 | B2* | 5/2011 | Weissmueller et al. .......... 725/22 |
| 8,427,511 | B2* | 4/2013 | Shin et al. ...................... 345/661 |
| 2008/0068348 | A1 | 3/2008 | Rosenberg et al. |
| 2010/0045569 | A1* | 2/2010 | Estevez et al. ................. 345/3.1 |
| 2011/0001699 | A1* | 1/2011 | Jacobsen et al. .............. 345/157 |
| 2011/0037711 | A1* | 2/2011 | Siddiqui et al. ............... 345/173 |
| 2011/0084900 | A1* | 4/2011 | Jacobsen et al. .............. 345/156 |

* cited by examiner

*Primary Examiner* — Andrew Sasinowski
(74) *Attorney, Agent, or Firm* — McDermott Will & Emery LLP (57) ABSTRACT

Systems and methods for providing an input remotely are provided. In some aspects, a method includes remotely capturing at least a part of a graphical display with a camera; sending a connection request; displaying the captured at least a part of the graphical display on a touchscreen; receiving an input on the touchscreen; aligning the captured at least a part of the graphical display on the touchscreen with the graphical display; and sending a request for refreshing the graphical display in response to the input.

20 Claims, 13 Drawing Sheets

112 Specification.
The specification shall contain a written description of the invention, and of the manner and process of making and using it, in such full, clear, concise, and exact terms as to enable any person skilled in the art to which it pertains, or with which it is most nearly connected, to make and use the same, and shall set forth the best mode contemplated by the inventor of carrying out his invention.

§112 Specification.
The specification shall contain a written description of the invention, and of the manner and process of making and using it, in such full, clear, concise, and exact terms as to enable any person skilled in the art to which it pertains, or with which it is most nearly connected, to make and use the same, and shall set forth the best mode contemplated by the inventor of carrying out his invention.

HANDHELD INPUT DEVICE FOR A COMPUTER

BACKGROUND

The subject technology generally relates to computer input devices.

Many computing devices, including laptop computers and desktop computers, use keyboards as input devices. However, a keyboard is not convenient for some situations, such as for unconstrained Unicode character input.

SUMMARY

The disclosed subject matter relates to a machine-implemented method of remotely providing an input by a handheld input device comprising a camera and a touchscreen. The method includes remotely capturing at least a part of a graphical display of a computer separate from the handheld input device with the camera, sending a connection request to the computer in association with the capturing of the at least the part of the graphical display, displaying the captured at least the part of the graphical display on the touchscreen, receiving a touch input on the touchscreen, aligning the captured at least the part of the graphical display on the touchscreen with the graphical display, and sending a request for refreshing the graphical display in response to the touch input to the computer.

The disclosed subject matter relates to a non-transitory computer-readable medium that includes instructions. The instructions include code for receiving display parameters of at least a part of a graphical display of a computer separate from the handheld input device, sending a connection request to the computer in association with the capturing of the at least the part of the graphical display, displaying the captured at least the part of the graphical display on the touchscreen, receiving an authentication of the handheld input device, receiving a touch input on the touchscreen, aligning the captured at least a part of the graphical display on the touchscreen with the graphical display, and sending a request for refreshing the graphical display in response to the touch input to the computer.

The disclosed subject matter relates to a handheld input device for remotely providing an input. The handheld input device may comprise a camera for capturing at least a part of a graphical display of a computer separate from the handheld input device, a touchscreen for displaying the at least the part of the graphical display captured by the camera and for receiving a touch input, and a remote input initiating interface. The remote input initiating interface may comprise a positional registration module for aligning the captured at least part of the graphical display on the touchscreen with the graphical display, and a communication interface for providing a request for refreshing the graphical display in response to the touch input on the touchscreen.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for using a detachable handheld input device to remotely provide an input to a main computer. The detachable handheld input device may have a camera and a touchscreen. It may be independent from the main computer but can be in temporary association with the main computer to work as the main computer's input device. A user may point the detachable handheld input device at at least a part of a graphical display on a screen of the main computer he/she wants to interact with, and the camera may capture the at least the part of the graphical display on the screen of the main computer and display it on the touchscreen. The detachable handheld input device may receive an input on the touchscreen, and send the input data to the main computer to refresh the graphical display.

Figure 1:
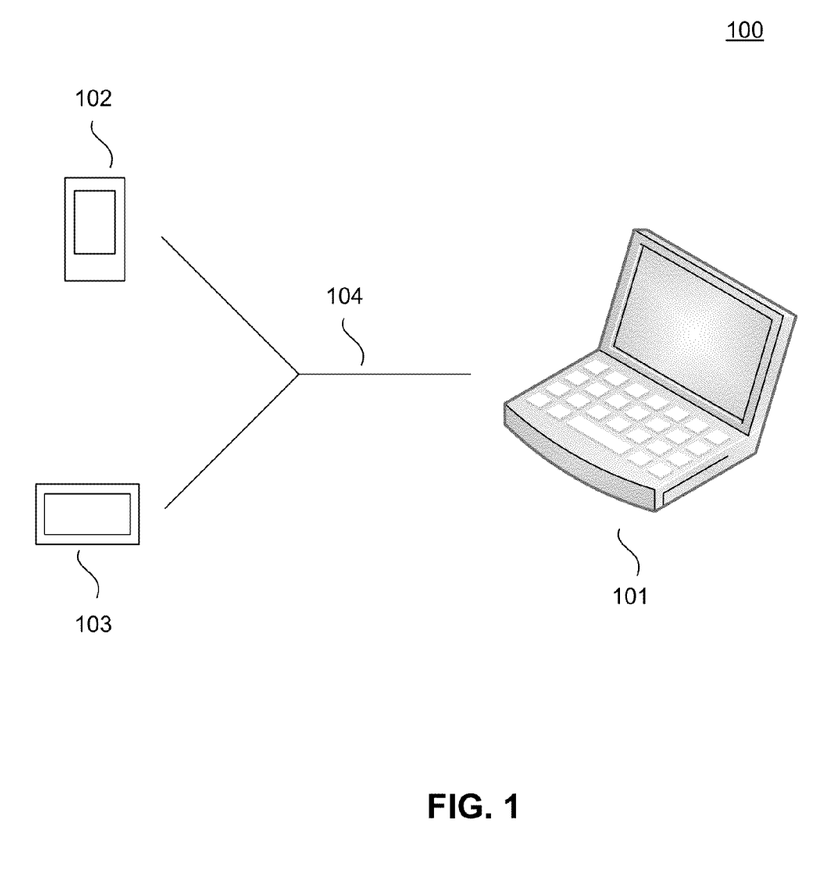
FIG. 1 illustrates a block diagram of an example of a computer input system.

FIG. 1 illustrates a block diagram of an example of a computer input system. As shown, the computer input system 100 may include a main computer 101 and one or more detachable handheld input devices 102 and 103. The handheld input device 102 or 103 may be a handheld device with a touchscreen and a camera, e.g., a mobile phone. The handheld input device 102 or 103 may be independent from the main computer 101 but can be in temporary association with the main computer 101 to work as the main computer's input device. The handheld input device 102 or 103 may communicate with the main computer 101 via a wireless communication channel 104, which may be, e.g., Wifi, cellular radio or Bluetooth.

Figure 2:
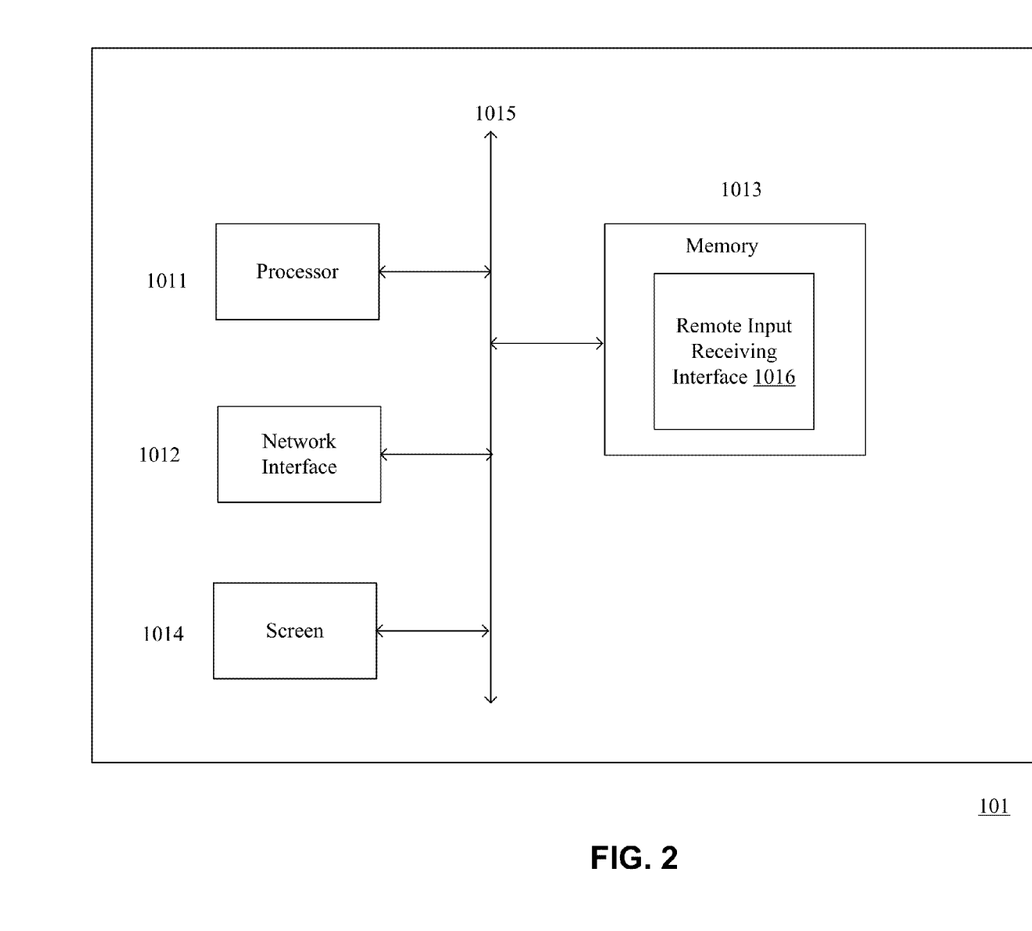
FIG. 2 illustrates a block diagram of an example of the main computer shown in FIG. 1.

FIG. 2 illustrates a block diagram of an example of the main computer 101 shown in FIG. 1. As shown, the main computer 101 may include a processor 1011, a network interface 1012, a memory 1013 and a screen 1014 coupled to each other via a bus 1015. The processor 1011 is configured to execute computer instructions that are stored in a computer-readable medium, for example, the memory 1013. The processor 1011 may be a central processing unit (CPU). The network interface 1012 is configured to allow the main computer 101 to communicate with the detachable handheld input device 102 or 103 via the wireless communication channel 104. The network interface 1012 may include one or more network interface cards (NICs). The memory 1013 stores data and instructions. The memory 1013 may store a remote input receiving interface 1016.

The main computer 101 may be any commercially available computing device capable of displaying content, for example, via a web browser or via a specialized application. The main computer may be a laptop computer, a desktop computer, a tablet computer, a netbook, a physical machine or a virtual machine. Persons skilled in the art will recognize other devices that could implement the functionalities of the main computer 101.

Figure 3:
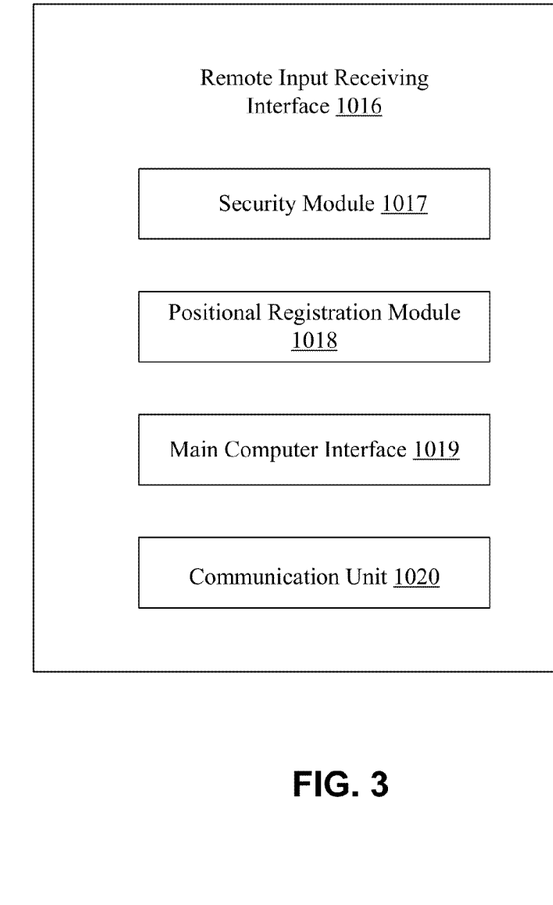
FIG. 3 illustrates a block diagram of an example of the remote input receiving interface shown in FIG. 2

FIG. 3 illustrates a block diagram of an example of the remote input receiving interface 1016 shown in FIG. 2. As shown, the remote input receiving interface 1016 may include a security module 1017, a positional registration module 1018, a main computer interface 1019, and a communication unit 1020. The security module 1017 may communicate with a detachable handheld input device, e.g., handheld input device 102/103, to authenticate the detachable handheld input device before the main computer 101 can receive input from the detachable handheld input device. The authentication may be through, e.g., a password or Bluetooth pairing. The positional registration module 1018 may align the display on the touchscreen of the detachable handheld input device 102/103 and the graphical display on the screen 1014 of the main computer 101. In some implementations, the positional registration may be fulfilled by matching the display on the touchscreen of the handheld input device 102/103 to the graphical display on the screen 1014 of the main computer 101. In some implementations, the positional registration may be through the coordinates of the display on the touchscreen of the handheld input device 102/103 and the graphical display on the screen of the main computer 101. The communication unite 1020 may receive signals from the detachable handheld input device 102/103 and the main computer interface 1019 may start a routine to refresh the graphical display on the screen 1014 of the main computer 101 in response.

Figure 4:
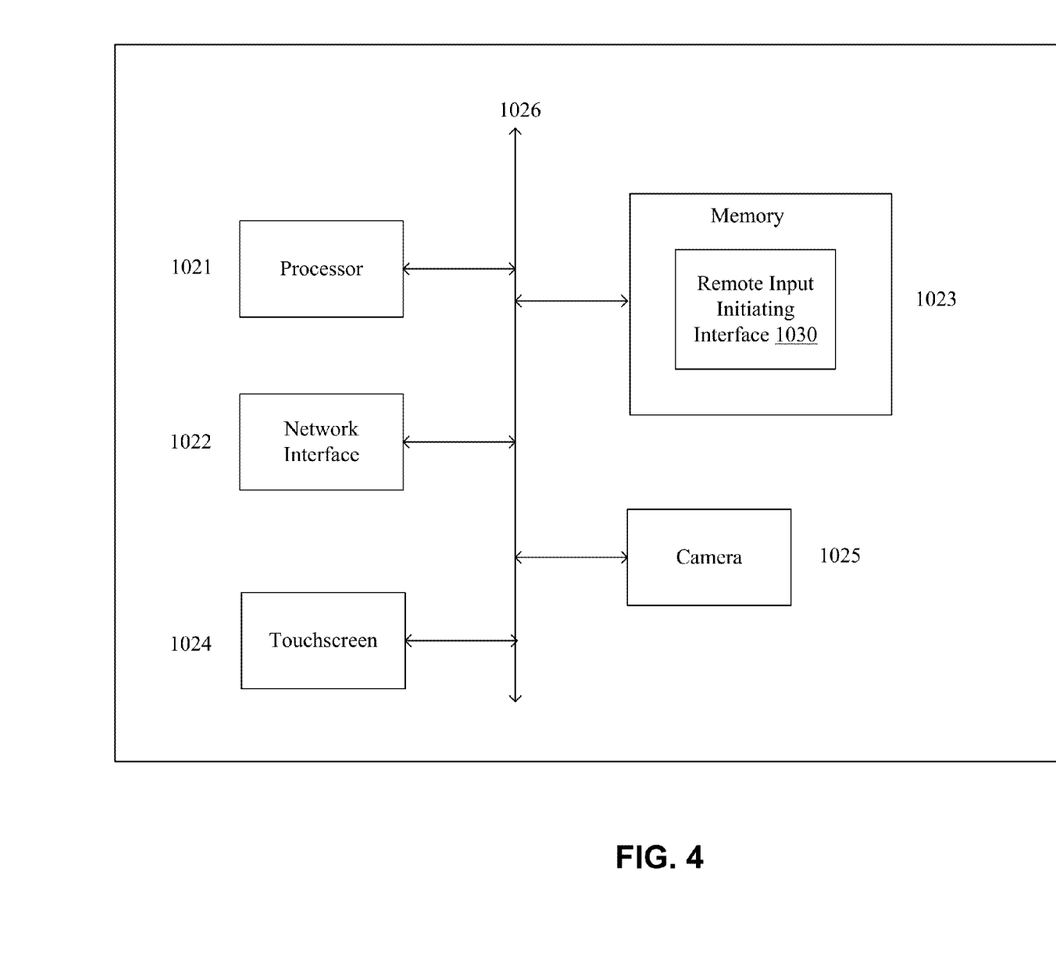
FIG. 4 illustrates a block diagram of an example of a detachable handheld input device shown in FIG. 1.

FIG. 4 illustrates a block diagram of an example of a detachable handheld input device 102/103 shown in FIG. 1. As shown, the detachable handheld input device 102/103 may include a processor 1021, a network interface 1022, a memory 1023, a touchscreen 1024 and a camera 1025 coupled to each other via a bus 1026. The processor 1021 is configured to execute computer instructions that are stored in a computer-readable medium, for example, the memory 1023. The processor 1021 may be a central processing unit (CPU). The network interface 1022 is configured to allow the detachable handheld input device 102/103 to communicate with the main computer 101 via the wireless communication channel 104. The network interface 1022 may include one or more network interface cards (NICs). The memory 1023 stores data and instructions. The memory 1023 may store a remote input initiating interface 1030. The camera 1025 may capture at least a part of a graphical display on the screen 1014 of the main computer 101 a user wants to interact with. The touchscreen 1024 may display the at least a part of the graphical display on the screen 1014 of the main computer 101 captured by the camera and receive a user input.

The detachable handheld input device 102/103 may be any handheld electronic device with a touchscreen and capable of communicating with a main computer. The detachable handheld input device 102/103 may be, e.g., a mobile phone, a smartphone, a PDA, or a tablet computer. Persons skilled in the art will recognize other devices that could implement the functionalities of the detachable handheld input device 102/103.

Figure 5:
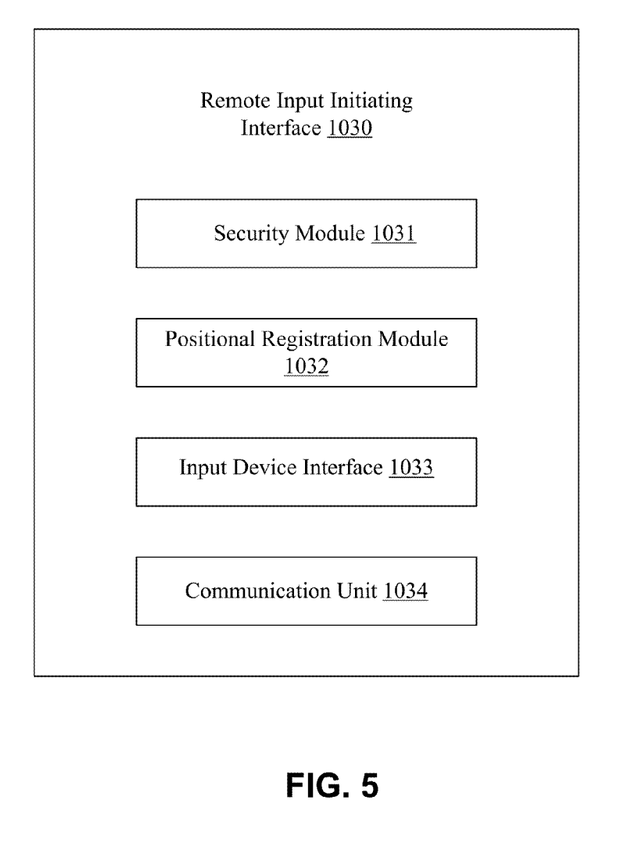
FIG. 5 illustrates a block diagram of an example of the remote input initiating interface shown in FIG. 4.

FIG. 5 illustrates a block diagram of an example of the remote input initiating interface 1030 shown in FIG. 4. As shown, the remote input initiating interface 1030 may include a security module 1031, a positional registration module 1032, an input device interface 1033, and a communication unit 1034.

Figure 7A:
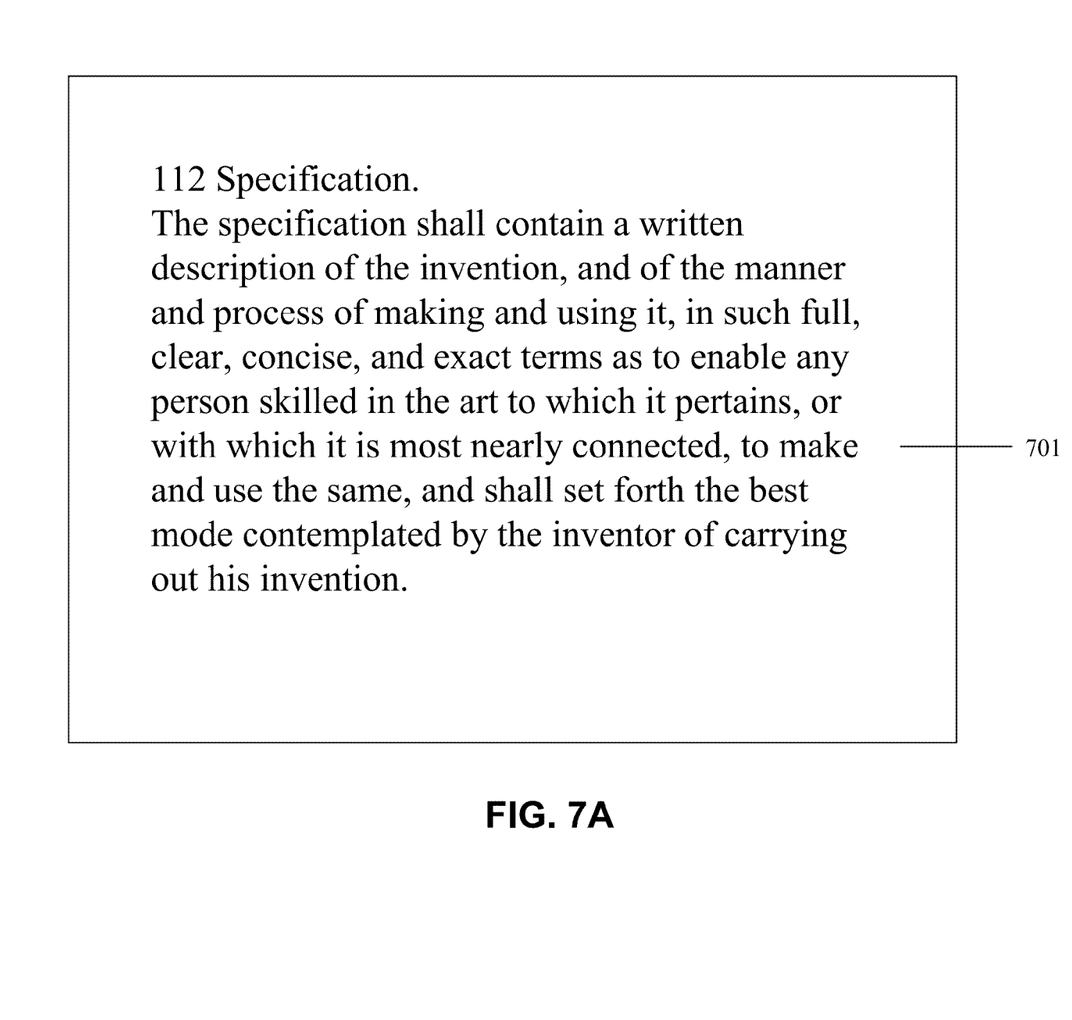
FIG. 7A shows an example of the graphical display on the screen of the main computer.
Figure 7B:
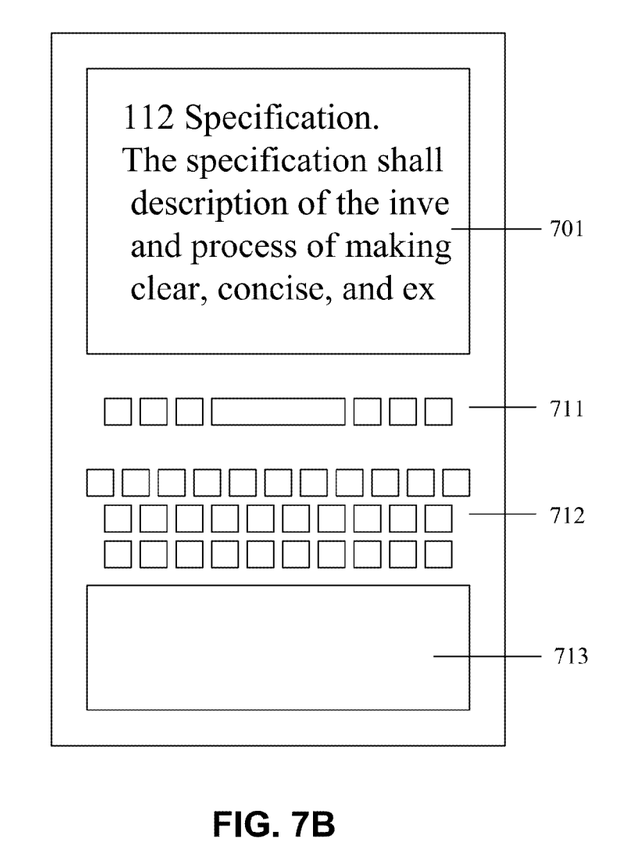
FIG. 7B shows an example of the display on the touchscreen.

A user may point the detachable handheld input device 102/103 at least a part of a graphical display on the screen 1014 of the main computer 101 he/she wants to interact with, and the camera 1025 may capture the at least a part of the graphical display on the screen 1014 of the main computer 101 and display it on the touchscreen 1024. As shown in FIG. 7B, in addition to the at least a part of the graphical display 701 on the screen 1014 of the main computer 101, the display on the touchscreen 1024 may also include a tool bar 711, a virtual keyboard 712 and/or a window 713 that allows the user to navigate through the at least a part of the graphical display and/or enter characters. The security module 1031 in the detachable handheld input device 102/103 may communicate with the security module 1017 in the main computer 101 to authenticate the detachable handheld input device 102/103 before the main computer 101 can receive input from the detachable handheld input device 102/103. The authentication may be through, e.g., a password or Bluetooth pairing. The positional registration module 1032 may communicate with the positional registration module 1018 in the main computer 101 to align the display on the touchscreen 1024 of the detachable handheld input device 102/103 and the graphical display on the screen 1014 of the main computer 101. In some implementations, the positional registration module 1032 may send display data of the detachable handheld input device 102/103 to the main computer 101, so that the positional registration module 1018 in the main computer 101 may match the display on the touchscreen 1024 to the graphical display on the screen 1014 of the main computer 101. In some implementations, the positional registration module 1032 may send coordinates of the display on the touchscreen 1024 to the main computer 101 so that the positional registration module 1018 in the main computer 101 may align the displays through the coordinates. The input device interface 1033 may receive the input on the touchscreen 1024, start a routine to refresh the display on the touchscreen 1024. The communication unit 1034 may send the input data to the main computer 101.

In some implementations, both the main computer 101 and the detachable handheld input device 102/103 may communicate with a cloud computing mechanism and a positional registration module on either side may align the display on the touchscreen 1024 of the detachable handheld input device 102/103 and the graphical display on the screen 1014 of the main computer 101.

In some implementations, both the detachable handheld input device 102/103 and the main computer 101 are authenticated. Before the main computer 101 can receive input from the detachable handheld input device 102/103, the security module 1031 in the detachable handheld input device 102/103 and the security module 1017 in the main computer 101 may communicate with each other to determine that the detachable handheld input device 102/103 is authenticated to provide input to the main computer 101, and the main computer 101 is authenticated to receive input from the detachable handheld input device 102/103.

Figure 6:
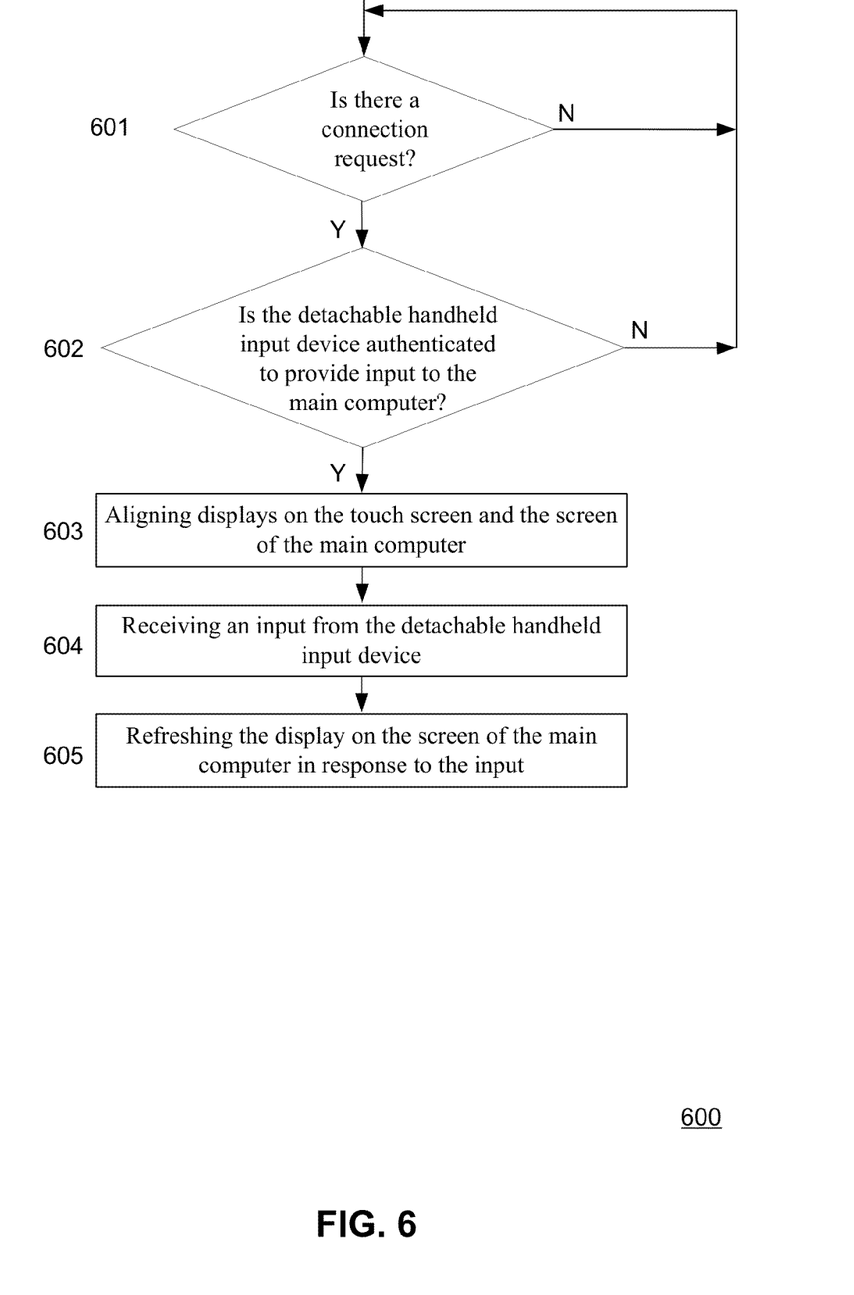
FIG. 6 illustrates a flowchart of an example method for using the main computer to receive an input from a detachable handheld input device.

FIG. 6 illustrates a flowchart of an example method for using the main computer 101 to receive an input from a detachable handheld input device 102/103.

At 601, it may be determined (e.g., by the security module 1017 in the main computer 101) if there is a connection request from a detachable handheld input device. If not, 601 may be repeated.

The connection request may be sent by the security module 1031 in the detachable handheld input device 102/103 and may be, e.g., a password or a Bluetooth pairing request. The camera 1025 in the detachable handheld input device 102/103 may start to capture at least a part of a graphical display on the screen 1014 of the main computer 101 and the at least a part of the graphical display may be displayed on the touchscreen 1024. FIG. 7A shows an example of the graphical display on the screen 1014 of the main computer 101, and FIG. 7B shows an example of the display on the touchscreen 1024. As shown, in addition to the at least a part of the graphical display 701 on the screen 1014 of the main computer 101, the display on the touchscreen 1024 may also include a tool bar 711, a virtual keyboard 712 and/or a window 713 that allows the user to navigate through the at least a part of the graphical display and/or enter characters.

If there is a connection request from a detachable handheld input device, at 602, it may be determined (e.g., by the security module 1017 in the main computer 101) whether the detachable handheld input device is authenticated to provide input to the main computer 101. The authentication may be through a password or Bluetooth pairing. If the detachable handheld input device is not authenticated, the process may return to 601.

If the detachable handheld input device is authenticated, at 603, the display on the touchscreen 1024 of the detachable handheld input device 102/103 and the graphical display on the screen 1014 of the main computer 101 may be aligned. In some implementations, the positional registration module 1032 in the detachable handheld input device 102/103 and the positional registration module 1018 in the main computer 101 may communicate to align their displays. Examples of the graphical display on the screen 1014 of the main computer 101 and the touchscreen 1024 are shown in FIGS. 7A and 7B.

Figure 7C:
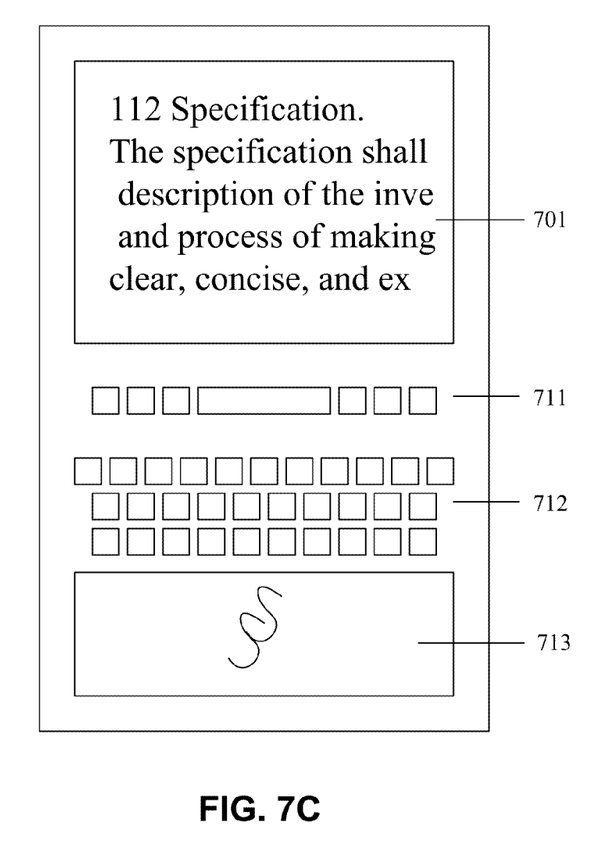
FIG. 7C shows an example of an input on the touchscreen.
Figure 7D:
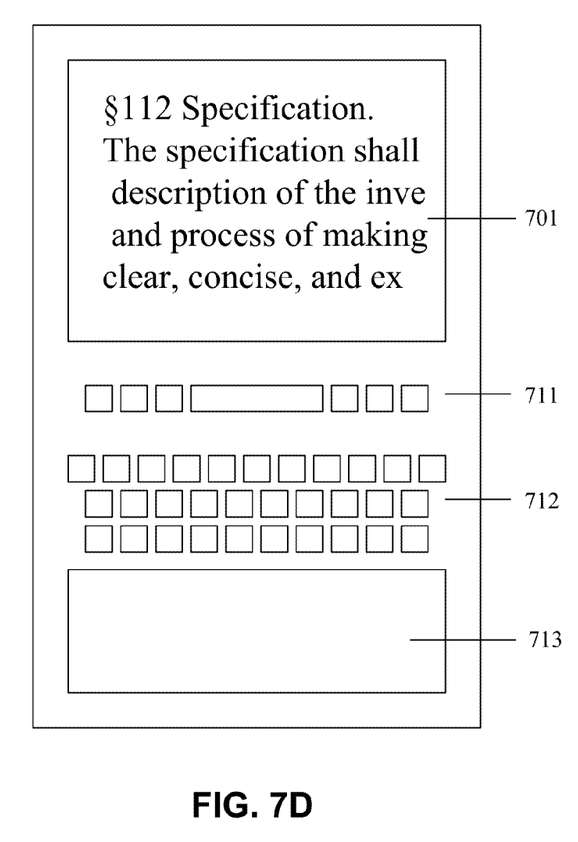
FIG. 7D shows an example of a display on the touchscreen refreshed in response to an input on the touchscreen.

At 604, an input from the detachable handheld input device may be received, e.g., by the communication unit 1020 in the main computer. In one example, the user wants to insert the character "§" before the term "112 Specification". The user may tap on the touchscreen 1024 to move the cursor before the term "112 Specification", and draw the character "§" in the window 713 with a finger or a stylus, as shown in FIG. 7C. The display on the touchscreen 1024 may be refreshed in response to the user input, as shown in FIG. 7D. In one example, the input device interface 1033 may receive the input on the touchscreen 1024, start a routine to refresh the display on the touchscreen 1024.

Figure 7E:
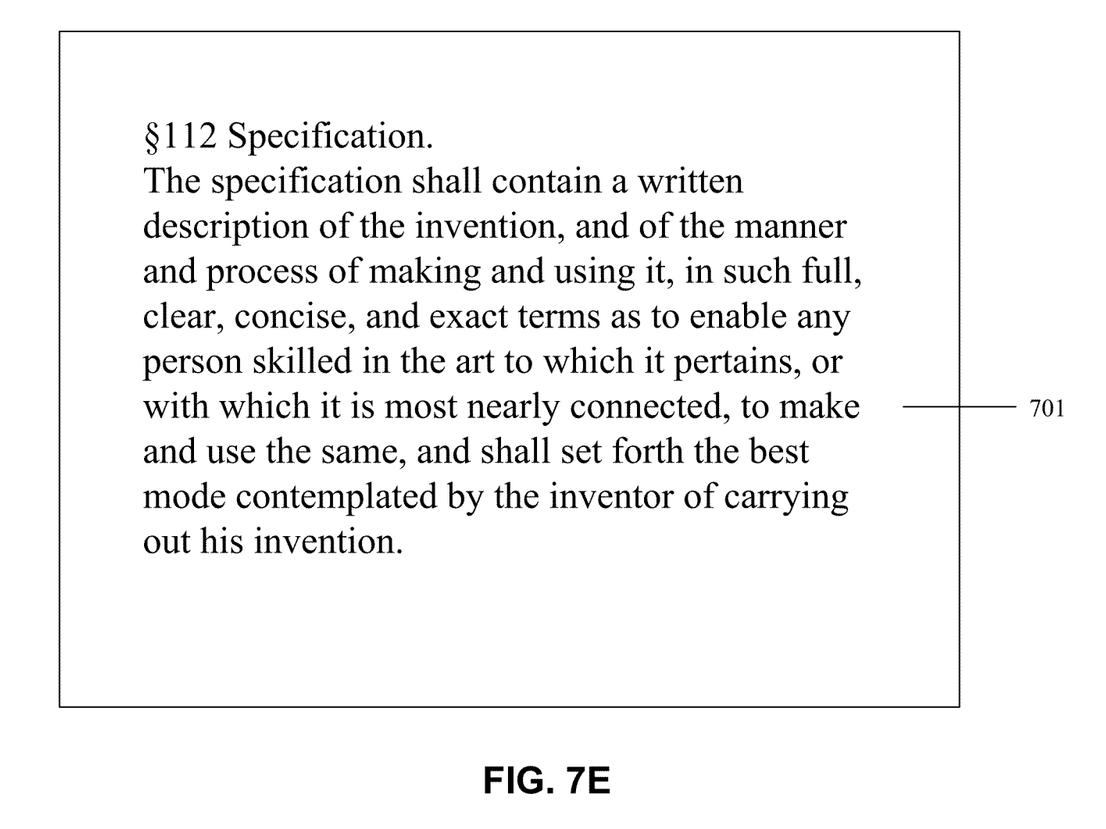
FIG. 7E shows an example of a display on the screen of the main computer refreshed in response to an input on the touchscreen.

At 605, the graphical display on the screen 1014 of the main computer 101 may be refreshed in response to the input from the detachable handheld input device, as shown in FIG. 7E. In one example, the main computer interface 1019 may start a routine to refresh the graphical display on the screen 1014 of the main computer 101 in response.

Figure 8:
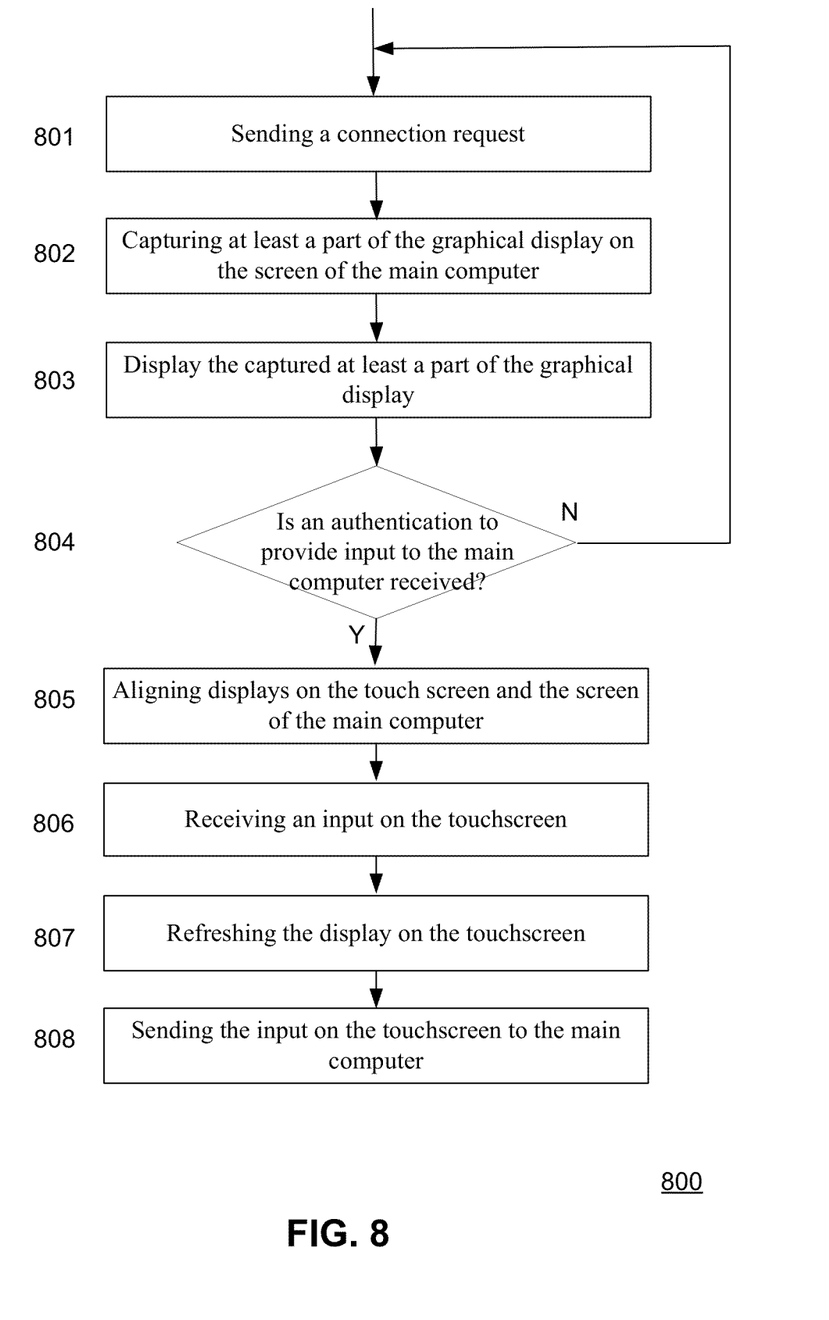
FIG. 8 illustrates a flowchart of an example method for using a detachable handheld input device 102 to provide an input to the main computer 101.

FIG. 8 illustrates a flowchart of an example method for using a detachable handheld input device 102/103 to provide an input to the main computer 101.

At 801, a connection request may be sent, e.g., from the security module 1031 in the detachable handheld input device 102/103 to the main computer 101. The connection request may be, e.g., a password or a Bluetooth pairing request.

At 802, at least a part of a graphical display on the screen 1014 of the main computer 101 may be captured, e.g., by the camera 1025.

At 803, the at least a part of the graphical display may be displayed, e.g., on the touchscreen 1024. FIG. 7A shows an example of the graphical display on the screen of the main computer 101, and FIG. 7B shows an example of the display on the touchscreen 1024. As shown, in addition to the at least a part of the graphical display 701 on the screen 1014 of the main computer 101, the display on the touchscreen 1024 may also include a tool bar 711, a virtual keyboard 712 and/or a window 713 that allows the user to navigate through the at least a part of the graphical display and/or enter characters.

At 804, it may be determined whether an authentication for providing an input to the main computer 101 is received. The authentication may be through a password or Bluetooth pairing. If not, the process may return to 801.

If an authentication for providing an input to the main computer 101 is received, at 805, the display on the touchscreen 1024 of the detachable handheld input device 102/103 and the graphical display on the screen 1014 of the main computer 101 may be aligned. In some implementations, the positional registration module 1032 in the detachable handheld input device 102/103 and the positional registration module 1018 in the main computer 101 may communicate to align their displays.

At 806, an input may be received, at the touch screen 1024. In one example, the user wants to insert the character "§" before the term "112 Specification". The user may tap on the touchscreen 1024 to move the cursor before the term "112 Specification", and draw the character "§" in the window 713 with a finger or a stylus, as shown in FIG. 7C.

At 807, the display on the touchscreen 1024 may be refreshed in response to the user input, as shown in FIG. 7D. In one example, the input device interface 1033 may receive the input on the touchscreen 1024, and start a routine to refresh the display on the touchscreen 1024.

At 808, the input on the touchscreen may be sent to the main computer 101, e.g., by the communication unit 1034.

The graphical display on the screen 1014 of the main computer 101 may be refreshed in response to the input from the detachable handheld input device 102/103, as shown in FIG. 7E. In one example, the communication unit 1020 may receive signals from the detachable handheld input device 102/103 and the main computer interface 1019 may start a routine to refresh the graphical display on the screen 1014 of the main computer 101 in response.

Although FIG. 6 and FIG. 8 are described with reference to the configurations of FIGS. 1-5, the processes of FIG. 6 and FIG. 8 are not limited to such configurations and can be applied to other systems and configurations.

In some implementations, the display on the detachable handheld input device 102/103 may be a modified, augmented, or freshly generated version of the graphical display on the screen 1014 of the main computer 101. In one example, the detachable handheld input device 102/103 may generate the display on the touchscreen 1024 locally based on shared display parameters of the main computer 101, e.g., from direct communication with the main computer 101, or via the cloud. In one example, display on the touchscreen 1024 of the detachable handheld input device 102/103 may be colorized according to who made a given edit and when, independently of whether the graphical display on the screen 1014 of the main computer 101 is similarly annotated.

Figure 9:
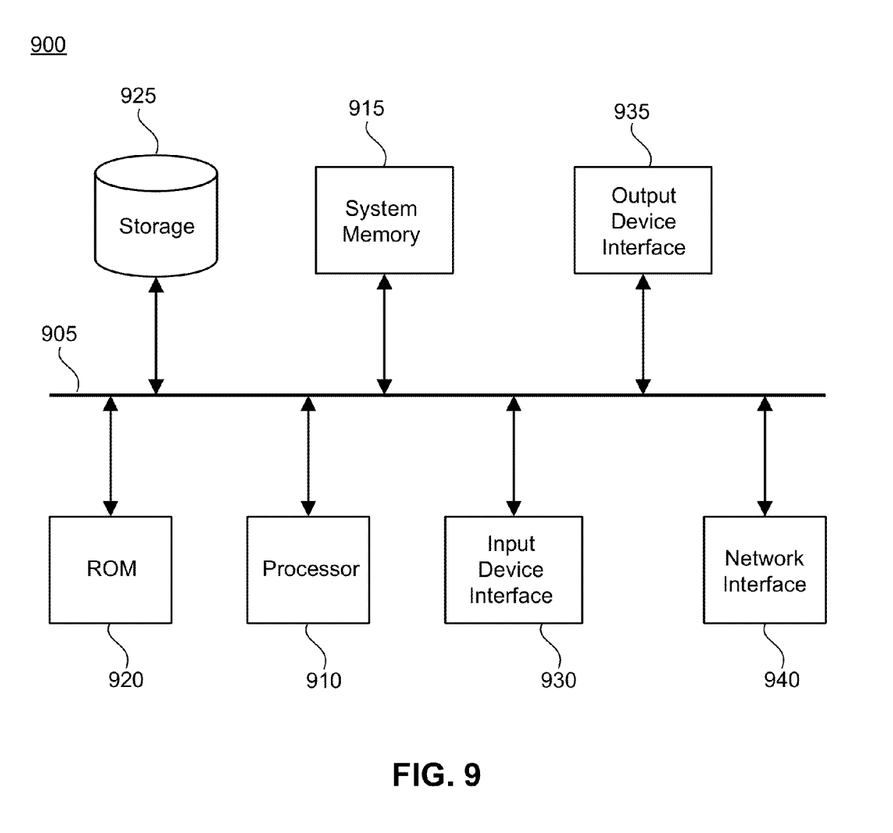
FIG. 9 conceptually illustrates an example electronic system with which some implementations of the subject technology are implemented.

FIG. 9 conceptually illustrates an electronic system 900 with which some implementations of the subject technology are implemented. For example, one or more of the main computer 101 or the detachable handheld input device 102 or 103 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for remotely providing input in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A handheld input device for remotely providing an input, comprising:
    a camera for capturing at least a part of a graphical display of a computing device separate from the handheld input device;

a touchscreen for displaying the at least the part of the graphical display captured by the camera and for receiving a touch input; and a remote input initiating interface, comprising:
- a positional registration module for aligning the captured at least part of the graphical display on the touchscreen with the graphical display; and
- a communication interface for providing a request for refreshing the graphical display in response to the touch input on the touchscreen.

2. The handheld input device of claim 1, wherein the request for refreshing the graphical display is sent to the computing device via a wireless communication channel.

3. The handheld input device of claim 1, wherein the remote input initiating interface further comprises an input device interface for processing the touch input and displaying it on the touchscreen.

4. The handheld input device of claim 1, wherein the remote input initiating interface further comprises a security module for determining that the handheld input device is authenticated to provide input to the computing device.

5. The handheld input device of claim 4, wherein the security module further sends a connection request to the computing device.

6. The handhold input device of claim 1, wherein the positional registration module sends coordinates of the captured at least part of the graphical display on the touchscreen to the computing device.

7. The handhold input device of claim 1, wherein the positional registration module sends display data of the captured at least part of the graphical display on the touchscreen to the computing device.

8. The handhold input device of claim 1, wherein the positional registration module receives display data of the at least part of the graphical display from a cloud computer mechanism.

9. The handhold input device of claim 1, wherein the touch input is received on a window displayed on the touchscreen.

10. A method for remotely providing an input by a handheld input device comprising a camera and a touchscreen, the method comprising:
- remotely capturing at least a part of a graphical display of a computing device separate from the handheld input device with the camera;
- sending a connection request to the computing device in association with the capturing of the at least the part of the graphical display;
- displaying the captured at least the part of the graphical display on the touchscreen;
- receiving a touch input on the touchscreen;
- aligning the captured at least the part of the graphical display on the touchscreen with the graphical display; and
- sending a request for refreshing the graphical display in response to the touch input to the computing device.

11. The method of claim 10, wherein the request for refreshing the graphical display is sent to the computing device via a wireless communication channel.

12. The method of claim 10, further comprising determining that the computing device is authenticated to receive input from the handheld input device.

13. The method of claim 12, wherein the computing device is determined to be authenticated to receive input from the handheld input device through a password or Bluetooth pairing.

14. The method of claim 10, further comprising processing the touch input and displaying it on the touchscreen.

15. The method of claim 10, further comprising receiving an authentication for providing an input to the computing device.

16. The method of claim 10, further comprising sending coordinates of the captured at least part of the graphical display on the touchscreen to the computing device.

17. The method of claim 10, further comprising sending display data of the captured at least part of the graphical display on the touchscreen to the computing device.

18. The method of claim 10, further comprising receiving display data of the at least part of the graphical display from a cloud computer mechanism.

19. The method of claim 10, further comprising receiving the touch input on a window displayed on the touchscreen.

20. A non-transitory computer-readable medium for remotely providing an input by a handheld input device comprising a camera and a touchscreen, the computer-readable medium comprising instructions that, when executed by a computer, cause the computer to:
- receive display parameters of at least a part of a graphical display of a computing device separate from the handheld input device;
- send a connection request to the computing device in association with the receiving of the display parameters of the at least the part of the graphical display;
- generate the at least the part of the graphical display on the touchscreen with the received display parameters;
- receive an authentication of the handheld input device;
- receive a touch input on the touchscreen;
- align the captured at least a part of the graphical display on the touchscreen with the graphical display; and
- send a request for refreshing the graphical display in response to the touch input to the computing device.

* * * * *